Figure 2:
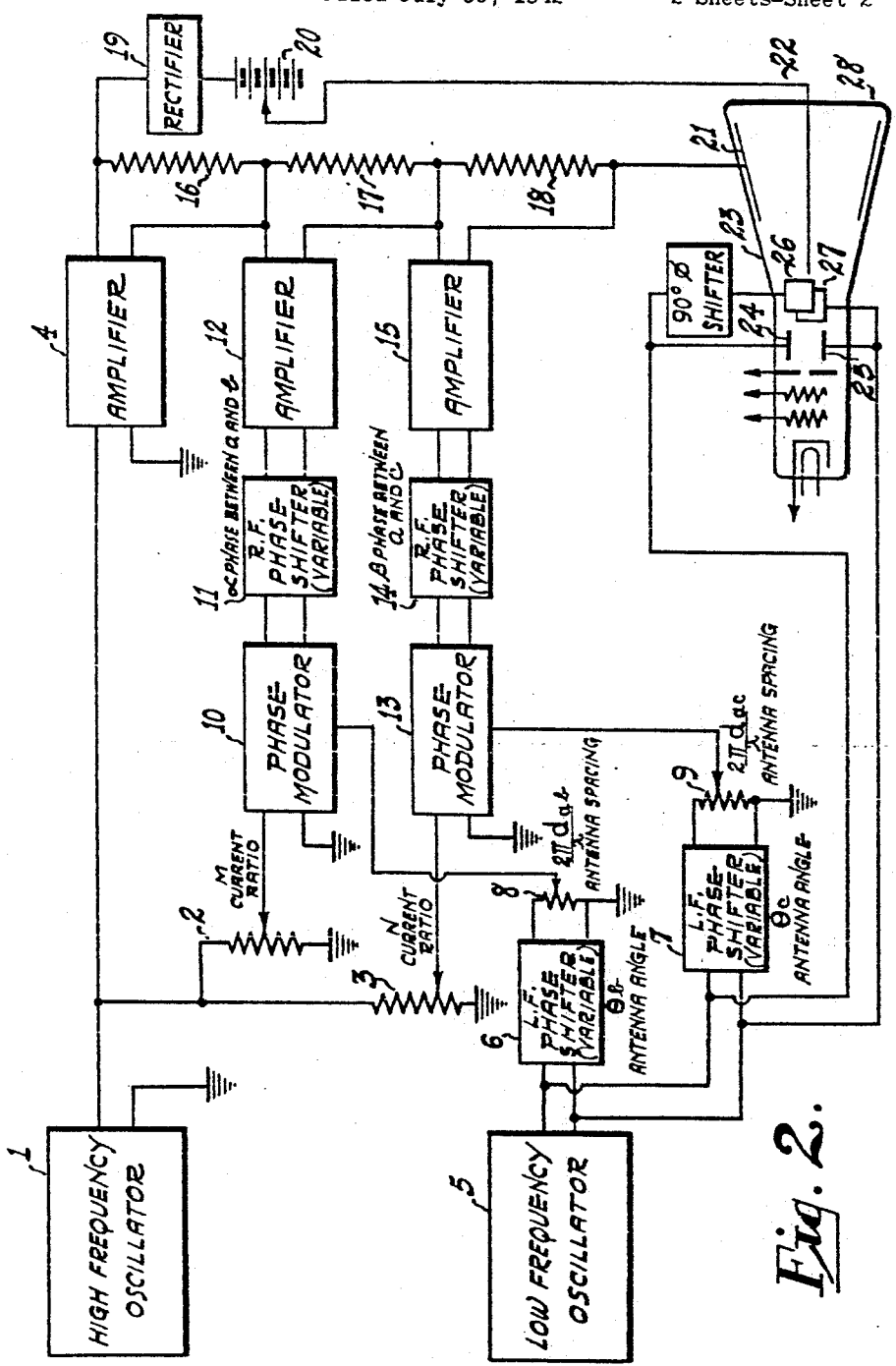

Dec. 28, 1943.  G. H. BROWN  2,337,968
METHOD OF AND MEANS FOR DETERMINING ANTENNA CONSTANTS
Filed July 30, 1942  2 Sheets-Sheet 1
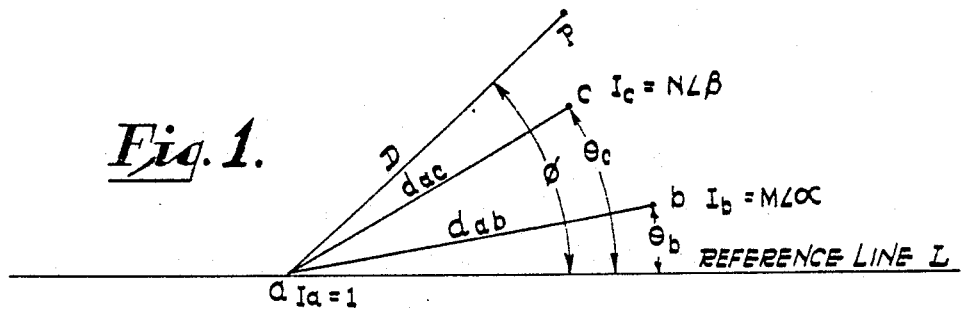
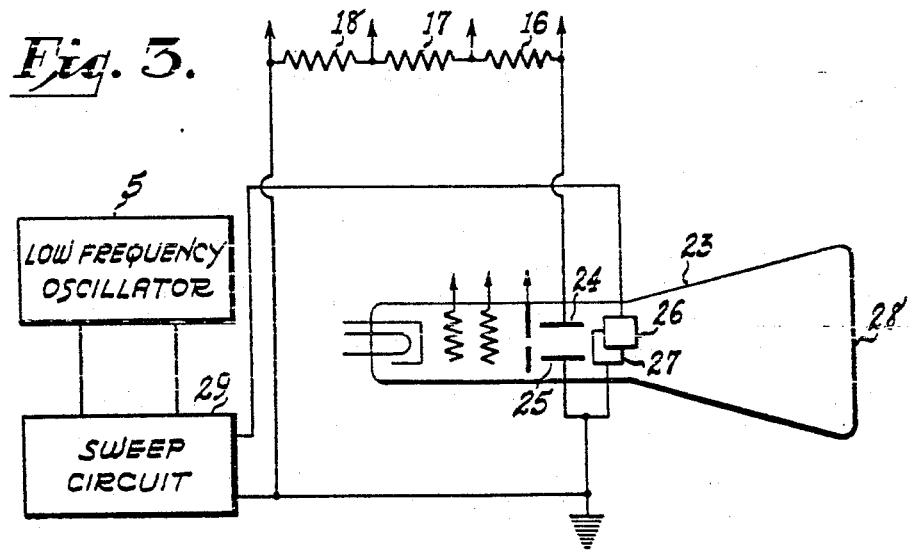
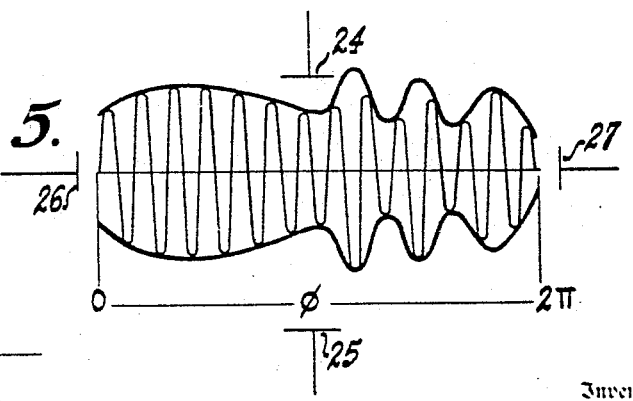
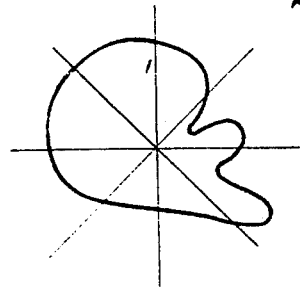
Inventor
GEORGE H. BROWN
By C & Puskea
Attorney Dec. 28, 1943.   G. H. BROWN   2,337,968
METHOD OF AND MEANS FOR DETERMINING ANTENNA CONSTANTS
Filed July 30, 1942   2 Sheets-Sheet 2

Inventor
GEORGE H. BROWN
CW Tuska
Attorney

Patented Dec. 28, 1943

2,337,968

UNITED STATES PATENT OFFICE 2,337,968

METHOD OF AND MEANS FOR DETERMINING ANTENNA CONSTANTS

George H. Brown, Haddonfield, N. J., assignor to Radio Corporation of America, a corporation of Delaware Application July 30, 1942, Serial No. 452,821

19 Claims. (Cl. 250—33)

This invention relates generally to antenna computing devices and particularly to an improved method of and means for computing the characteristics of a plurality of antennas in an array to obtain a predetermined radiation pattern therefor.

Heretofore the calculation of the characteristics of a complex antenna array, to obtain predetermined radiation directional patterns, has involved the mathematical solution of conventional antenna design formulae, by means of the adoption of arbitrary antenna constants, until the desired radiation pattern was derived. Such a "trial and error" method of solution is very tedious. Various mechanical devices utilizing linkage mechanisms have been devised to simplify such mathematical computation. However, such devices have provided only limited accuracy, and their utility has been limited to the design of comparatively simple antenna arrays.

The instant invention provides an improved and simplified means for indicating directly the four principal variables of each antenna in an array comprising as many antenna elements as desired. The four variables which must be known for each antenna in an array are: the individual antenna currents and phases, and the spacing and angular relation of each of the antennae with respect to one other antenna element.

Briefly, the improved system utilizes a novel combination of radio circuit elements in which the voltage amplitude of the output of a high frequency source is varied to correspond to the antenna current in a given antenna element. The output of a low frequency source is phase shifted to correspond to the antenna angular relation, and varied in amplitude to correspond to the antenna spacing, and this selected low frequency signal is used to phase modulate the selected high frequency signal. The phase modulated signal is again phase shifted to correspond to the current phase in the particular antenna element. The phase modulated, phase shifted signal is then combined with a reference signal from the high frequency source, and indicated with respect to time, to provide a direct indication of the radiation pattern.

If more than two antenna elements are desired, the output of additional phase modulation circuits, similar to that described heretofore, is combined with the original combined signals. The operator may, for example, place a desired pattern scale upon the screen of a cathode ray oscilloscope, and vary the amplitudes and phases of the high frequency and low frequency sources for the various antenna elements, until the combined signals produce a pattern which coincides with the desired pattern scale. As will be explained hereinafter, the radiation pattern may be indicated on a cathode ray oscilloscope in terms of either rectangular or polar coordinates.

Among the objects of the invention is to provide a new and improved method of and means for deriving the constants of the elements of an antenna array to provide a desired radiation pattern.

Another object is to provide a new and improved method of and means for varying the amplitude and phase of high frequency and low frequency sources, phase modulating the two frequencies, combining the output thereof with a high frequency reference voltage and indicating directly the radiation pattern of the array.

Another object is to provide an improved method of and means for applying a predetermined radiation pattern scale to an oscilloscope and applying to the deflecting elements thereof phase modulated high and low frequency voltages, the amplitude and phase of each component thereof being varied until the oscilloscope trace coincides with the desired field pattern.

The invention will be described by reference to the accompanying drawings of which Figure 1 is a plan view of a typical antenna array comprising three vertical antennas; Fig. 2 is a schematic block diagram of one embodiment of the invention; Fig. 3 is a schematic block diagram of a modification of the invention; Fig. 4 is a graph in polar coordinates of a typical indication provided by the invention; and Fig. 5 is a graph in rectangular coordinates of a similar indication provided thereby. Similar reference numerals are applied to similar elements throughout the drawings.

Referring to Fig. 1, a first vertical antenna $a$ is located on a reference line L. A second vertical antenna $b$ is located at a distance $d_{ab}$ from the first antenna $a$ and at an angle $\theta_b$ from the reference line L. A third vertical antenna $c$ is located at a distance $d_{ac}$ from the first vertical antenna $a$ and at an angle $\theta_c$ from the reference line L. The field strength of the array at any remote point P may be determined for any distance D at an angle $\phi$ to the reference line L. The current $I_a$ in the first antenna $a$ is taken as unity. The current $I_b$ in the second antenna $b$ equals a quantity M at a phase angle $\alpha$. The current $I_c$ in the third antenna $c$ is equal to a quantity N at a phase angle $\beta$. The angle $\phi$ may vary from 0 to 360°. For the three element antenna array illustrated the following formulas apply:

(1) $F = \dfrac{K}{r}\left[ I_a + I_b \angle + \dfrac{2\pi d_{ab}}{\lambda} \cos(\phi - \theta_b) + I_c \angle + \dfrac{2\pi d_{ac}}{\lambda} \cos(\phi - \theta_c) \right]$ or (2) $F = \dfrac{K}{r} I_a \left[ 1 + M \angle \alpha + \dfrac{2\pi d_{ab}}{\lambda} \cos(\phi - \theta_b) + N \angle \beta + \dfrac{2\pi d_{ac}}{\lambda} \cos(\phi - \theta_c) \right]$ where F represents the field intensity, and K and $r$ are constants which do not affect the shape of the field pattern. A more detailed explanation of operating conditions in predetermined antenna arrays may be found in an article entitled "Directional antennas" by George H. Brown, published in the January 1937 issue of the Proceedings of the Institute of Radio Engineers. It should be understood that the antenna angular relation referred to herein refers to relative antenna position in a reference plane, and not to relative antenna polarization characteristics in which the radiation pattern shape S is given by the term in the brackets:

(3) $S = \left[ 1 + M \angle \alpha + \dfrac{2\pi d_{ab}}{\lambda} \cos(\phi - \theta_b) + N \angle \beta + \dfrac{2\pi d_{ac}}{\lambda} \cos(\phi - \theta_c) \right]$ or (4) $S = \left[ 1 + M \cos\left\{\alpha + \dfrac{2\pi d_{ab}}{\lambda} \cos(\phi - \theta_b)\right\} + N \cos\left\{\beta + \dfrac{2\pi d_{ac}}{\lambda} \cos(\phi - \theta_c)\right\} \right] + j\left[ M \sin\left\{\alpha + \dfrac{2\pi d_{ab}}{\lambda} \cos(\phi - \theta_b)\right\} + N \sin\left\{\beta + \dfrac{2\pi d_{ac}}{\lambda} \cos(\phi - \theta_c)\right\} \right]$ It will be seen that since (5) $\quad S = a + jb$ where $a$ and $b$ are the real and imaginary terms, respectively, in Equation 4, and the absolute value of (6) $\quad S = \sqrt{a^2 + b^2}$ when $\phi$ varies from 0 to 360° (0 to $2\pi$ radians), and all other quantities are fixed, the instantaneous values will be (7) $S = \left[ 1 + M \cos\left\{\alpha + \dfrac{2\pi d_{ab}}{\lambda} \cos(\phi - \theta_b)\right\} + N \cos\left\{\beta + \dfrac{2\pi d_{ac}}{\lambda} \cos(\phi - \theta_c)\right\} \right] \sin \omega t + \left[ M \sin\left\{\alpha + \dfrac{2\pi d_{ab}}{\lambda} \cos(\phi - \theta_b)\right\} + N \sin\left\{\beta + \dfrac{2\pi d_{ac}}{\lambda} \cos(\phi - \theta_c)\right\} \right] \cos \omega t$ Referring to Fig. 2, a source of high frequency current 1, which is preferably frequency stabilized, is connected to a first voltage divider 2, a second voltage divider 3 and the input circuit of a first amplifier 4. A low frequency current source 5 is connected to the input of a first low frequency variable phase shifter 6 and a second low frequency variable phase shifter 7, which permits the phase to be varied through 360°. The output of the first low frequency variable phase shifter 6 is connected across a third voltage divider 8. The output of the second low frequency variable phase shifter 7 is connected across a fourth voltage divider 9. The slider of the first voltage divider 2 is connected to the input of a first phase modulator 10. The slider of the third voltage divider 8 is connected to the input of the first phase modulator 10. The output of the first phase modulator 10 is connected through a first variable radio frequency phase shifter 11 to the input of a second amplifier 12. Likewise the slider of the second voltage divider 3 and the slider of the fourth voltage divider 9 are connected to the input of a second phase modulator 13. The output of the second phase modulator 13 is connected through a second variable radio frequency phase shifter 14 to the input of a third amplifier 15.

It should be understood that the system just described includes the necessary circuit components for calculating the characteristics of three antenna elements. If more than this number are required two additional voltage dividers, two additional phase shifters, one phase modulator and one amplifier, similarly connected to the elements described heretofore, will be required for each additional antenna element.

The outputs of the first, second and third amplifiers 4, 12 and 15 are connected to the series resistors 16, 17 and 18 to combine the outputs thereof. The combined output voltage across the series resistors is connected, through a conventional rectifier 19, and a variable source of bias potential 20, which may be a battery, to the electron beam radial deflecting elements 21, 22 of a cathode ray oscilloscope 23. The power connections to the oscilloscope electron gun are conventional. A source of timing voltage to produce a circular trace may be derived from the low frequency source 5, and applied directly to the oscilloscope vertical deflecting elements 24, 25 and through a 90° phase shifter to the oscilloscope horizontal deflecting elements 26, 27. The apparatus described will provide an indication of the antenna radiation pattern in polar coordinates, since the normal electron beam trace will be circular, and variations thereof, due to the combined signal characteristics, will provide radial deflection of the normally circular trace to correspond to the antenna array radiation pattern which is obtained as follows:

The instantaneous voltage derived from the high frequency source through the first amplifier 4 may be considered to be $1.0 \sin \omega t$. The voltage derived from the low frequency source 5, and applied to the input of the first and second variable low frequency phase shifters 6 and 7, respectively, may be taken to equal $K \cos \omega_0 t$. Likewise the voltage applied to the first and second voltage dividers 2 and 3 will equal $1.0 \sin \omega t$, while the high frequency voltage applied to the first phase modulator 10 may be taken to equal $M \sin \omega t$ and the high frequency voltage applied to the second phase modulator 13 may be taken to equal $N \sin \omega t$.

The low frequency voltage applied to the third voltage divider 8 may be considered to be $K \cos(\omega_0 t - \theta_b)$ while the voltage derived from the slider of the third voltage divider 8 and applied to the input of the first phase modulator 10 will be $$\frac{2\pi d_{ab}}{\lambda} \cos(\omega_0 t - \theta_b)$$

The voltage $E_2$ at the output of the first phase modulator 10 will be (8) $\quad E_2 = M \sin\left[\omega t + \frac{2\pi d_{ab}}{\lambda} \cos(\omega_0 t - \theta_b)\right]$ while the voltage $E_{12}$ at the output of the second amplifier 12 will be (9) $\quad E_{12} = M \sin\left[\omega t + \alpha + \frac{2\pi d_{ab}}{\lambda} \cos(\omega_0 t - \theta_b)\right]$ Likewise the voltage $E_{13}$ at the output of the third amplifier 15 will be

(10) $\quad E_{13} = N \sin\left[\omega t + \beta + \frac{2\pi d_{ac}}{\lambda} \cos(\omega_0 t - \theta_c)\right]$ Since the output voltages of the first, second and third amplifiers 4, 12 and 15 are combined in the series resistor circuit comprising the resistors 16, 17 and 18, these voltages are added, and if we use the expansion of $\sin(a+b) = \sin a \cos b + \sin b \cos a$, we find the sum $E$ of these voltages to be

(11) $E = \left[1 + M \cos\left\{\alpha + \frac{2\pi d_{ab}}{\lambda} \cos(\omega_0 t - \theta_b)\right\} + N \cos\left\{\beta + \frac{2\pi d_{ac}}{\lambda} \cos(\omega_0 t - \theta_c)\right\}\right] \sin \omega t +$
$\left[M \sin\left\{\alpha + \frac{2\pi d_{ab}}{\lambda} \cos(\omega_0 t - \theta_b)\right\} + N \sin\left\{\beta + \frac{2\pi d_{ac}}{\lambda} \cos(\omega_0 t - \theta_c)\right\}\right] \cos \omega t$ Comparing this last equation with equation 7 we see that $2\pi > \phi > 0$ and $2\pi > \omega_0 t > 0$.

It will be seen that $M$, which is the current ratio between the currents in the antennas $a$ and $b$, will be derived from the variable portion of the first voltage divider 2. $\theta_b$ which is the angular relation between the line through the antennas $a$ and $b$, with respect to the reference line L, will be determined by the phase shift of the first low frequency variable phase shifter 6. The antenna spacing $$\frac{2\pi d_{ab}}{\lambda}$$

between the first and second antennas $a$ and $b$, will be determined by the voltage derived from the third voltage divider 8. The antenna current phase angle $\alpha$, between the currents in the first and second antennas $a$ and $b$, will be determined by the phase shift provided by the first radio frequency phase shifter 11.

Likewise the antenna current $N$ in the third antenna $c$ will be determined by the voltage derived from the second voltage divider 3. The antenna angle $\theta_c$, formed by line through the through the first and third antennas $a$ and $c$ with the reference line L, will be determined by the phase shift provided by the second low frequency phase shifter 7. The antenna spacing $$\frac{2\pi d_{ac}}{\lambda}$$

between the antennas $a$ and $c$, will be determined by the voltage derived from the fourth voltage divider 9, and the phase angle $\beta$ between the currents in the antennas $a$ and $c$ will be determined by the second radio frequency phase shifter 14.

If a desired radiation pattern scale in polar coordinates is applied to the fluorescent screen 28 of the oscilloscope 23, the various voltage dividers and phase shifters may be adjusted by the operator until the cathode ray trace coincides with the desired scale pattern. Then the constants of the current ratios, current phases and antenna angular relations and spacings may be directly derived from the settings of the individual voltage dividers and phase shifters, which have been previously calibrated.

Fig. 3 is a modification of the circuit of Fig. 2, to provide a cathode ray oscilloscope indication in rectangular coordinates, instead of the polar coordinate indicating system described heretofore. The combined signals derived from the first, second and third amplifiers 4, 12 and 15, respectively, are applied, as described heretofore, across the series resistors 16, 17 and 18, respectively. The rectifier 19 and a source of bias potential 20 are omitted, as well as the radial deflecting electrodes 21 and 22, described heretofore. The combined voltage, derived from across the series resistors 16, 17 and 18, is applied to the vertical deflecting electrodes 24, 25 of the oscilloscope 23. A timing voltage, derived through a conventional sweep circuit 29, from the low frequency source 5, is applied to the horizontal deflecting electrodes 26, 27.

A typical pattern of the radiation characteristics of an antenna array is indicated in polar coordinates in Fig. 4. The circuit of Fig. 2 will provide such an indication. Another typical indication of the radiation pattern of an antenna array is shown in Fig. 5. This type of indication may be derived from the modified circuit of Fig. 3.

It should be understood that the high frequency source described heretofore may be of any convenient frequency value, while the low frequency source may be either a separat oscillator, or may be derived directly from the 60-cycle power line.

Thus the invention described comprises a comparatively simple and easily operable means for determining directly the required constants of an antenna array of any complexity, whereby a desired radiation pattern may be provided and the antenna constants may be directly determined therefor. It should be understood that the actual adjustment of the various voltage dividers and phase shifters of the circuits described heretofore may be accomplished either manually or by any well known mechanical devices. It should also be understood that the three vertical antenna elements, described herein, have been used solely for the purpose of illustration, and that any number and arrangement, as well as type, of antenna array elements is included within the scope of the invention.

I claim as my invention:

1. The method of determining the characteristics of an antenna array having a plurality of spaced antennas in angular relation to each other to obtain a predetermined radiation pattern therefor comprising deriving a plurality of modulated voltages, one for each antenna, of phase and amplitude characteristics proportional, respectively, to the current amplitude and phase and the antenna spacing and angular position of each of said antennas, combining said modulated voltages, and indicating said combined voltages with respect to time for providing a direct indication of the radiation pattern of said array.

2. Apparatus for determining the characteristics of an antenna array having a plurality of spaced antennas in angular relation to each other to obtain a predetermined radiation pattern therefor including means for deriving a plurality of voltages proportional respectively to the currents in each of said antennas, means for deriving a plurality of potentials proportional respectively to the spacing of said antennas, means for phasing each of said potentials in accordance with said antenna angular relations, means for modulating said respective voltages and potentials, means for phasing said modulated signals in accordance respectively with the current phase in each of said antennas, means for combining said modulated phase shifted signals, and means for indicating said combined signals in respect to time for providing a direct indication of the radiation pattern of said array.

3. In a system for determining the characteristics of an antenna array having a plurality of spaced antennas in angular relation to each other to provide predetermined radiation patterns, said system including a high frequency source, a low frequency generator and a cathode ray oscilloscope having a plurality of ray deflecting elements, the method comprising deriving a first voltage from said high frequency source proportional in amplitude and phase to the current in one of said antennas, deriving at least one other voltage from said source proportional respectively in amplitude and phase to the currents in the others of said antennas, combining said voltages, applying said combined voltages to one of said deflecting elements, deriving a timing voltage from said generator, and applying said timing voltage to at least one other of said deflecting elements.

4. A method of the type described in claim 3 including indicating said voltage amplitudes in terms of antenna spacings and antenna currents, and indicating said voltage phases in terms of antenna angles and antenna current phases.

5. In a system for determining the characteristics of an antenna array having a plurality of spaced antennas in angular relation to each other to provide desired radiation patterns, said system including a high frequency source, a low frequency generator and a cathode ray oscilloscope having a plurality of deflecting elements, the method comprising deriving a first voltage from said source proportional in amplitude and phase to the current in one of said antennas, deriving a second voltage from said source corresponding to the currents in another of said antennas, deriving a third voltage from said generator corresponding in amplitude to the spacing of said antennas, phase shifting said third voltage corresponding to the angular relation of said antennas, phase modulating said second voltages with said third corresponding voltages, phase shifting each of said phase modulated voltages corresponding to the current phases in the respective antennas, combining said phase shifted phase modulated voltages with said first voltage, applying said combined voltage to one of said deflecting elements, deriving a timing voltage from said generator, and applying said timing voltage to at least one other of said deflecting elements.

6. A method of the type described in claim 5 including indicating said second voltages in terms of antenna currents, indicating said third voltages in terms of antenna spacings, indicating said phase shifted third voltages in terms of antenna angular relations and indicating said phase shifted phase modulated voltage in terms of antenna current phases, all with respect to the first of said antennas.

7. Apparatus for determining the characteristics of an antenna array having a plurality of spaced antennas in angular relation to each other to provide predetermined radiation patterns therefor including a high frequency source, a low frequency generator, a cathode ray oscilloscope having a plurality of ray deflecting elements, means for deriving from said source a first voltage proportional in amplitude and phase to the current in one of said antennas, means for deriving from said source a second voltage corresponding in amplitude and phase to the currents in the others of said antennas, means for combining said voltages, means for applying said combined voltages to one of said deflecting elements, means for deriving from said generator a timing voltage, and means for applying said timing voltage to at least one other of said deflecting elements.

8. Apparatus of the type described in claim 7 including means for indicating said voltage amplitude in terms of antenna spacing and antenna current, and means for indicating said voltage phase in terms of antenna angle and antenna current phase.

9. Apparatus for determining the characteristics of an antenna array having a plurality of spaced antennas in angular relation to each other to provide predetermined radiation patterns therefor including a high frequency source, a low frequency generator, a cathode ray oscilloscope having a plurailty of deflecting elements, means for deriving from said source a first voltage proportional in amplitude and phase to the current in one of said antennas, means for deriving from said source a second voltage corresponding to the currents in the others of said antennas, means for deriving from said generator a third voltage corresponding in amplitude to the spacing of said antennas, means for phase shifting said third voltage corresponding to the angular relation of said antennas, means for phase modulating said second voltage with said third voltage, means for phase shifting said phase modulated voltages corresponding to the current phases in the respective antennas, means for combining said phase shifted phase modulated voltages with said first voltage, means for applying said combined voltage to one of said deflecting elements, means for deriving a timing voltage from said generator, and means for applying said timing voltage to at least one other of said deflecting elements.

10. Apparatus of the type described in claim 9 including means for indicating said second voltage in terms of antenna current, means for indicating said third voltage in terms of antenna spacing, means for indicating said phase shifted third voltage in terms of the antenna angular relation, and means for indicating said phase shifted phase modulated voltages in terms of the antenna current phase, all with respect to the first of said antennas.

11. In a system for determining the characteristics of an antenna array having a plurality of spaced antennas in angular relation to each other to provide desired radiation patterns, said system including a high frequency source, a low frequency generator and a cathode ray oscilloscope having a plurality of ray deflecting elements, the method comprising applying a desired pattern to said oscilloscope screen representative of the desired radiation pattern, deriving a first voltage from said high frequency source proportional in amplitude and phase to the current in one of said antennas, deriving a second voltage from said source corresponding in amplitude and phase to the current in another of said antennas, combining said voltages, applying said combined voltages to one of said deflecting elements, deriving a timing voltage from said generator, applying said timing voltage to at least one other of said deflecting elements and varying said derived votlages until the trace on said oscilloscope coincides with said applied scale pattern.

12. A method of the type described in claim 11 including indicating said voltage amplitudes in terms of antenna spacing and antenna currents, and indicating said voltage phases in terms of antenna angles and antenna current phases.

13. In a system for determining the characteristics of an antenna array having a plurality of spaced antennas in angular relation to each other to provide predetermined radiation patterns, said system including a high frequency source, a low frequency generator and a cathode ray oscilloscope having a plurality of deflecting elements, the method comprising applying a pattern scale to said oscilloscope screen representative of the desired radiation pattern, deriving a first voltage from said source proportional in amplitude and phase to the current in one of said antennas, deriving a second voltage from said source corresponding to the current in another of said antennas, deriving a third voltage from said generator corresponding in amplitude to the spacing of said antennas, phase shifting said third voltage corresponding to the angular relation of said antennas, phase modulating said second voltage with said third corresponding voltage, phase shifting said phase modulated voltage corresponding to the current phases in the antennas, combining said phase shifted phase modulated voltage with said first voltage, applying said combined voltage to one of said deflecting elements, deriving a timing voltage from said generator, applying said timing voltage to at least one other of said deflecting elements and varying said derived voltages until the trace on said oscilloscope coincides with said applied scale pattern.

14. A method of the type described in claim 13 including indicating said second voltage in terms of antenna current, indicating said third voltage in terms of antenna spacing, indicating said phase shifted third voltage in terms of antenna angular relation and indicating said phase shifted phase modulated voltage in terms of antenna current phase, all with respect to the first of said antennas.

15. Apparatus for determining the characteristics of an antenna array having a plurality of spaced antennas in angular relation to each other to provide predetermined radiation patterns therefor including a high frequency source, a low frequency generator, a cathode ray oscilloscope having a plurality of ray deflecting elements, means for applying a pattern scale representative of the desired radiation pattern to said oscilloscope screen, means for deriving from said source a first voltage proportional in amplitude and phase to the current in one of said antennas, means for deriving from said source at least one other voltage corresponding in amplitude and phase to the currents in the others of said antennas, means for combining said voltages, means for applying said combined voltages to one of said deflecting elements, means for deriving from said generator a timing voltage, means for applying said timing voltage to at least one other of said deflecting elements and means for varying said derived voltages until the trace on said oscilloscope coincides with said applied scale pattern.

16. Apparatus of the type described in claim 15 including means for indicating said voltage amplitude, in terms of antenna spacing and antenna current, and means for indicating said voltage phase in terms of antenna angle and antenna current phase.

17. Apparatus for determining the characteristics of an antenna array having a plurality of spaced antennas in angular relation to each other to provide predetermined radiation patterns therefor including a high frequency source, a low frequency generator, a cathode ray oscilloscope having a plurality of deflecting elements, means for applying a pattern scale representative of the desired radiation pattern to said oscilloscope screen, means for deriving from said source a first voltage proportional in amplitude and phase to the current in one of said antennas, means for deriving from said source at least one other second voltage corresponding to the currents in the others of said antennas, means for deriving from said generator at least one other third voltage corresponding in amplitude to the spacing of said antennas, means for phase shifting each of said third voltages corresponding to the angular relation of said antennas, means for phase modulating said second voltages with said corresponding third voltages, means for phase shifting each of said phase modulated voltages corresponding to the current phases in the respective antennas, means for combining said phase shifted phase modulated voltages with said first voltage, means for applying said combined voltage to one of said deflecting elements, means for deriving a timing voltage from said generator, means for applying said timing voltage to at least one other of said deflecting elements, and means for varying said derived voltages until the trace on said oscilloscope coincides with said applied scale pattern.

18. Apparatus of the type described in claim 17 including means for indicating said second voltages in terms of the respective antenna currents, means for indicating said third voltages in terms of the respective antenna spacings, means for indicating said phase shifted third voltages in terms of the respective antenna angular relations, and means for indicating said phase shifted phase modulated voltages in terms of the respective antenna current phases, all with respect to the first of said antennas.

19. In a system for determining the characteristics of an antenna array having a plurality of spaced antennas in angular relation to each other to provide predetermined radiation patterns, said system including a high frequency source, a low frequency generator and a cathode ray oscilloscope having a plurality of ray deflecting elements, the method comprising applying a pattern scale to said oscilloscope screen representative of the desired radiation pattern, deriving a plurality of first voltages from said source, deriving at least one second voltage from said generator, adjusting the amplitude of said first voltages, adjusting the amplitude and phase of said second voltage, phase modulating said adjusted first and second voltages, adjusting the phase of said modulated voltages, combining said first and said phase adjusted modulated voltages, applying said combined voltages to one deflecting element of said oscilloscope, deriving timing voltages, applying said timing voltages to at least one other deflecting element of said oscilloscope, and varying all of said adjustments until the trace of said oscilloscope coincides with said applied scale pattern.

GEORGE H. BROWN.